(12) United States Patent
Turner et al.

(10) Patent No.: US 6,360,533 B1
(45) Date of Patent: Mar. 26, 2002

(54) HYDRODYNAMIC CONVERTER WITH CHANNEL INSERTS

(75) Inventors: Gary A. Turner, Livonia; Duane Michael Harbowy, Westland, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/680,026

(22) Filed: Oct. 10, 2000

(51) Int. Cl.⁷ .............................. F16D 33/00; F03B 3/12
(52) U.S. Cl. ................. 60/364; 416/197 C; 416/213 A; 416/229 R
(58) Field of Search .................. 60/330, 362, 364; 416/197 C, 180, 213 A, 229 R

(56) References Cited

U.S. PATENT DOCUMENTS 5,771,691 A * 6/1998 Kirkwood et al. ............ 60/345

* cited by examiner

Primary Examiner—F. Daniel Lopez
Assistant Examiner—Michael Leslie
(74) Attorney, Agent, or Firm—Laura C. Hargitt

(57) ABSTRACT

A hydrodynamic converter coupling member for a torque converter has a simplified structure that can include plastic materials and permit a reduction in components with simplified assembly processes which may result in lighter components and reduced assembly costs. For a turbine, the coupling is made with an outer shell and a plurality of channel inserts. The inserts form the curved channels or fluid passages of the turbine and include generally concentric curved inner and outer sides integrally connected to one another along one edge by a connecting wall that acts as a blade or vane. The inserts are secured in the outer shell with their outer sides against the outer shell. The inner sides are supported at both edges by the connecting walls, which are integral with one edge and include grooves for receiving the opposite free edges. Thus, the inner sides close the channels inwardly and avoid the need for a separate inner shell in the improved assembly.

10 Claims, 6 Drawing Sheets

HYDRODYNAMIC CONVERTER WITH CHANNEL INSERTS

TECHNICAL FIELD

This invention relates to hydrodynamic torque converters such as are used with automotive vehicle transmissions and the like. More particularly, the invention relates to a hydraulic coupling member using channel inserts mounted to an outer shell to form fluid flow passages in a coupling member, such as a turbine or impeller.

BACKGROUND OF THE INVENTION

It is known in the art to provide a hydrodynamic torque converter for an automotive transmission with coupling members, including an impeller and a turbine, which together with a stator include blades defining fluid circulation passages that transmit power from the impeller to the turbine for driving a vehicle. The passages are configured in a known manner so that engine torque delivered to the impeller is increased in the turbine when operating at lower speeds. The stator is mounted on a one way clutch so that the stator may rotate with the fluid flow as torque multiplication is reduced and the turbine speed increases to approach the rotational speed of the impeller.

Conventionally, the coupling members have been formed as castings or fabricated sheet metal members. A traditional sheet metal turbine assembly includes an inner shell, an outer shell and a plurality of stamped blades. During fabrication, the inner and outer shells are stamped and slotted. The blades are formed by multi-station stamping and stacked for assembly. An automatic blade setter inserts the blades serially into the outer shell. The inner shell is then assembled to the blades and the blade tabs are rolled down against the shell. Finally, the assembly is brazed to fill in gaps between the shells and the blades.

SUMMARY OF THE INVENTION

The present invention provides a converter coupling member having a simplified structure that can include plastic materials and permit a reduction in components with simplified assembly processes which may result in lighter components and reduced assembly costs. In the case of a turbine, the coupling is made with an outer shell and a plurality of channel inserts. The inserts form the curved channels or fluid passages of the turbine and include generally concentric curved inner and outer sides integrally connected to one another along one edge by a connecting wall that acts as a blade or vane. The inserts are secured in the outer shell with their outer sides against the outer shell. The inner sides are supported at both edges by the connecting walls, which are integral with one edge and include grooves for receiving the opposite unsupported edges. Thus, the inner sides close the channels inwardly and avoid the need for a separate inner shell in the improved assembly.

The channel inserts and the outer shell are preferably made from lightweight materials such as high temperature thermoplastics. However, suitable lightweight metals could be substituted if desired. To connect the inserts with the outer shell, the shell is perforated to receive plug-like appendages or pins extending from the outer sides of the inserts. The pins extend through the perforated openings and are swaged on the outer sides of the shell to fix them in place.

In one example of a turbine assembly according to the invention, the channel inserts are molded from a high temperature thermoplastic polyimide material. For a comparable turbine, the mass of the plastic channel inserts was found to be nearly 63 percent less than that of an equal number of stamped blades and the inner shell of a stamped metal turbine assembly which the channel inserts would replace. In another alternative, a polyamid material, such as DuPont® nylon 66, may be used for forming the channel inserts.

These and other features and advantages of the invention will be more fully understood from the following description of certain specific embodiments of the invention taken together with the accompanying drawings.

DESCRIPTION OF THE PREFERRED EMBODIMENT

Figure 1:
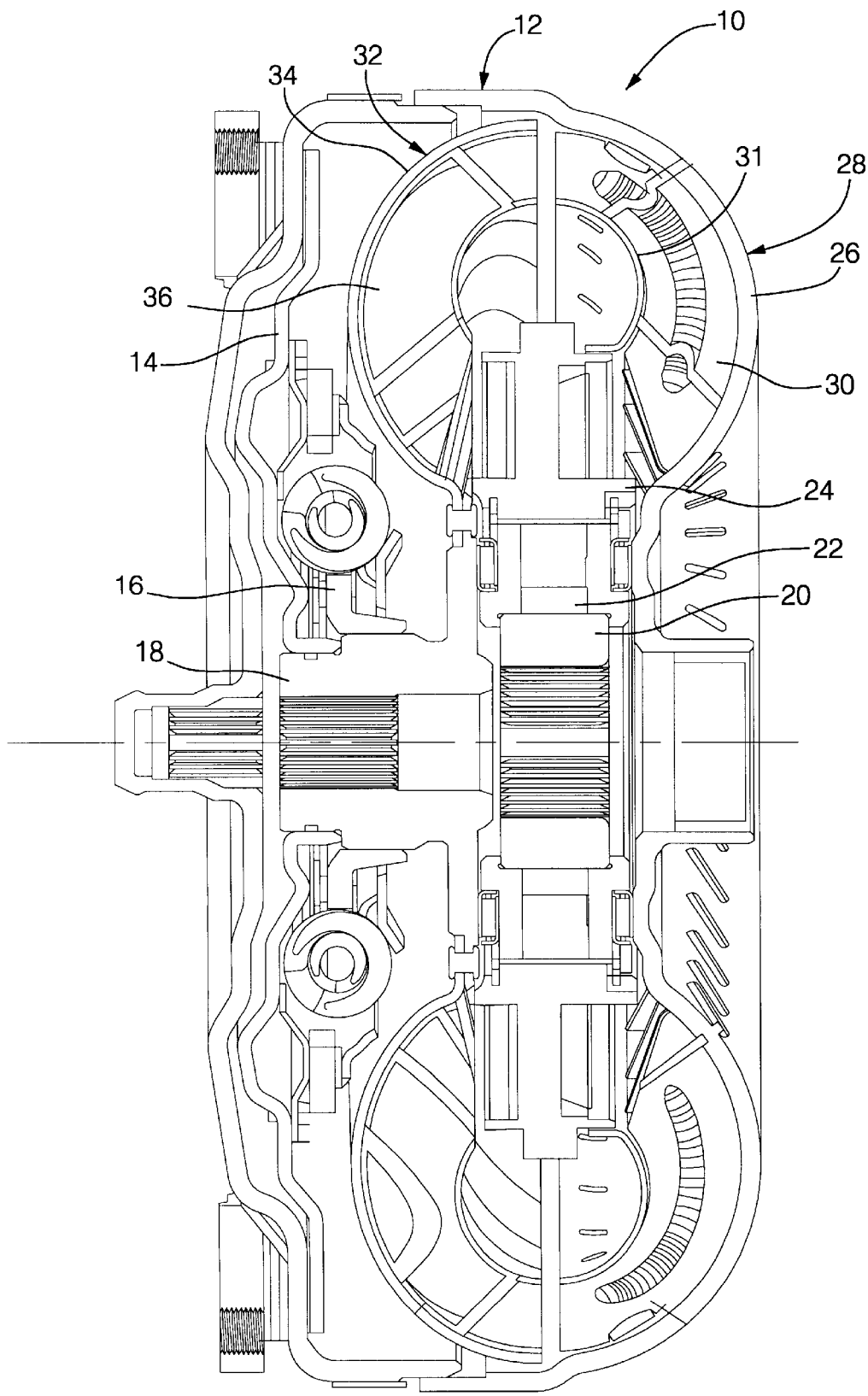
FIG. 1 is a cross-sectional view of a hydrodynamic torque converter having a turbine formed according to the invention.

Referring first to FIG. 1 of the drawings in detail, numeral 10 generally indicates a hydrodynamic torque converter for use with a transmission in the drivetrain of an automotive vehicle. Converter 10 includes a formed outer housing 12 enclosing a lockup clutch 14 connected through a torsion damping coupling 16 with an output hub 18. Coaxial with hub 18 is a stator hub 20 carrying a one way clutch 22 that conventionally supports a vaned stator 24. Housing 12 also acts as an outer shell 26 for an impeller 28 forming one hydrodynamic coupling member of the converter. Impeller 28 conventionally includes stamped blades 30 fixed between the outer shell 26 and a stamped inner shell 31. An improved turbine 32 according to the invention forms a second hydrodynamic coupling of the converter and is mounted on the output hub 18, facing the impeller 28.

In operation, the housing is rotated by an engine, not shown, causing fluid in the converter to be orbited and pumped by the impeller 28 into the turbine 32. There it imparts torque to drive the output hub 18, which is connected with the input shaft of a transmission, not shown. The fluid is redirected through the stator 24 to the impeller 28, obtaining torque multiplication in lower vehicle speeds and gradually approaching a unit ratio as vehicle speed is increased, load is reduced, and the stator begins to rotate with the turbine. Engagement of the lockup clutch 14 connects the engine through the torsional coupling 16 and hub 18 directly with the transmission, bypassing the hydrodynamic converter coupling members 28, 32 which rotate together without transmitting torque.

Figure 2:
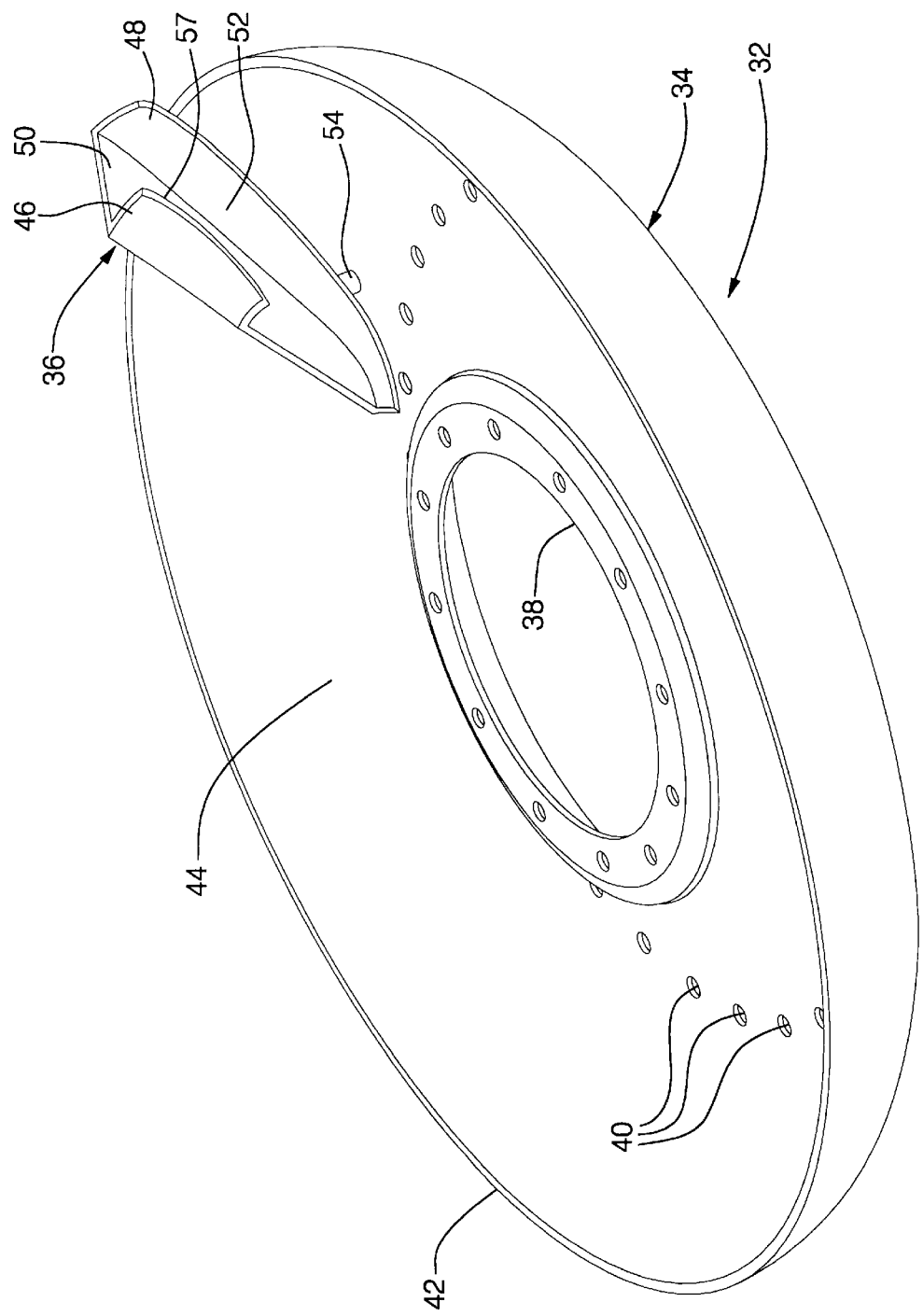
FIG. 2 is an exploded pictorial view showing components of the turbine in their assembled positions.

FIG. 2 illustrates components of an improved coupling member of the present invention as represented by turbine 32 of converter 10. The turbine includes an outer shell 34 and a plurality of preferably molded high temperature plastic channel inserts 36, only one of which is shown in FIG. 2. The shell 34 has a dished configuration terminating inwardly in an annular hub 38. The shell is perforated during forming with a ring of perforations or openings 40 spaced between the hub and an inturned outer lip 42, which together define an open sided annular chamber 44 in which the inserts 36 are received.

The inserts 36 each include generally concentric inner and outer sides 46, 48 connected to one another along joined edges by a curved connecting wall forming a vane 50. The vane 50 and sides 46, 48 together define a curved channel or passage 52, open on one side but to be closed in assembly by an adjacent insert. A plug like pin 54 extends out from the outer side 48 of each insert 36 and through one of the perforation openings 40 of the shell 34 for fixing the inserts in the shell as will be subsequently described.

Figure 3:
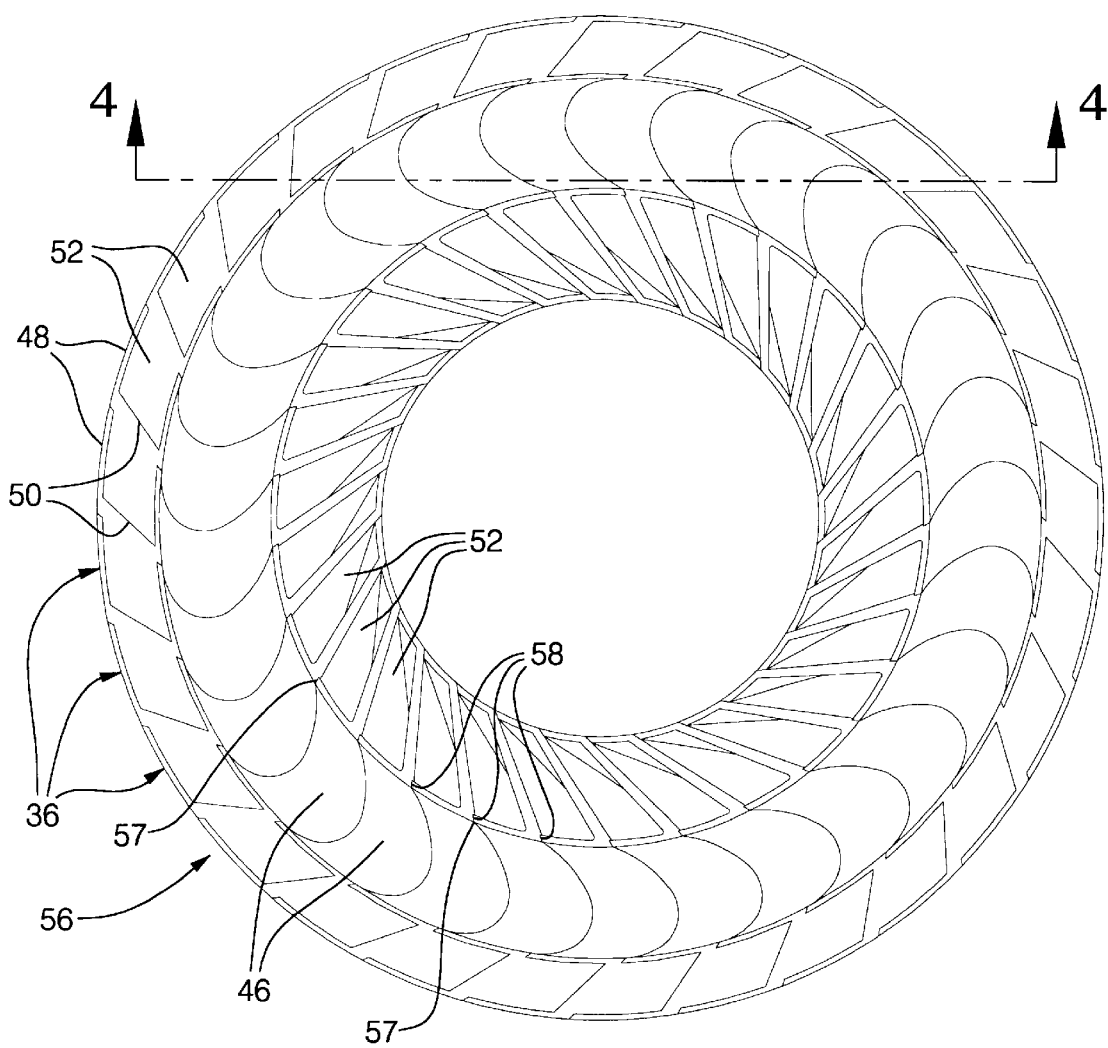
FIG. 3 is a face view from the inside of the assembled channel inserts for the turbine of FIGS. 1 and 2.
Figure 4:
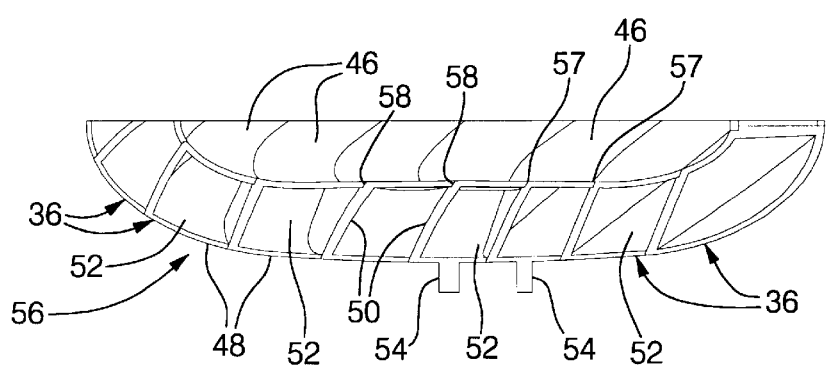
FIG. 4 is a cross-sectional view along the line 4—4 of FIG. 3.

FIGS. 3 and 4 show the inner face and cross section of the assembled channel inserts 36 for the turbine 32. The assembly, shown without the enclosing outer shell 34, is a ring 56 of twenty-nine (29) adjoining inserts 36 having inner and outer sides 46, 48 connected by integral vanes 50 as previously described. The inner sides 46 are cantilevered from the vane with their free edges 57 received in grooves 58 of an adjacent insert for supporting the free edges 57 on the adjoining vane. The vanes 50 and the sides 46, 48 together define the curved channels or passages 52 that carry fluid through the turbine.

Figure 5:
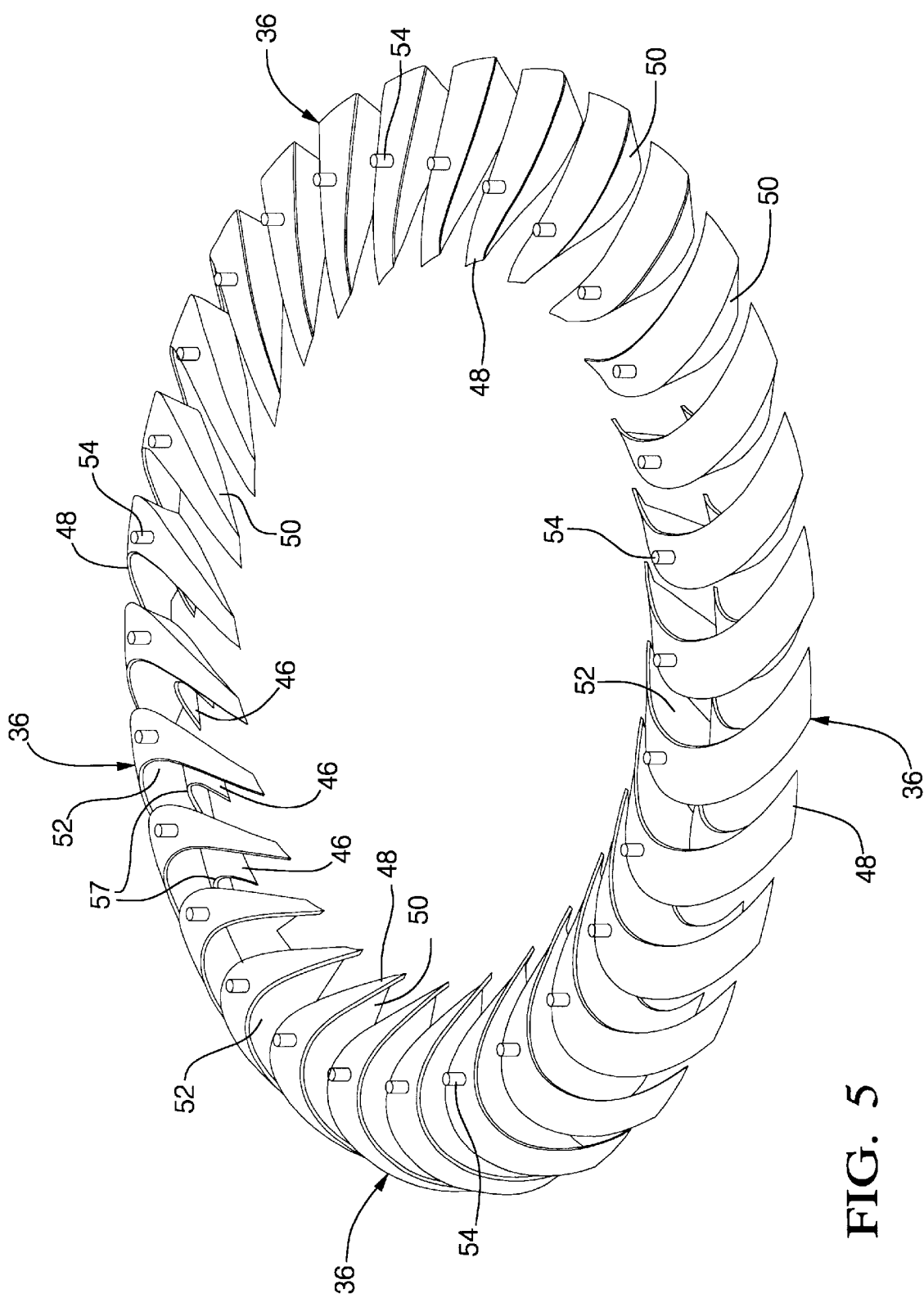
FIG. 5 is a pictorial outside view of the turbine channel inserts spaced out from their assembled positions.

FIG. 5 shows the molded plastic channel inserts 36 viewed from the outer side and arranged in spaced annular relation to illustrate their assembled relations. The various elements indicated above are indicated by the appropriate reference numerals.

Figure 6:
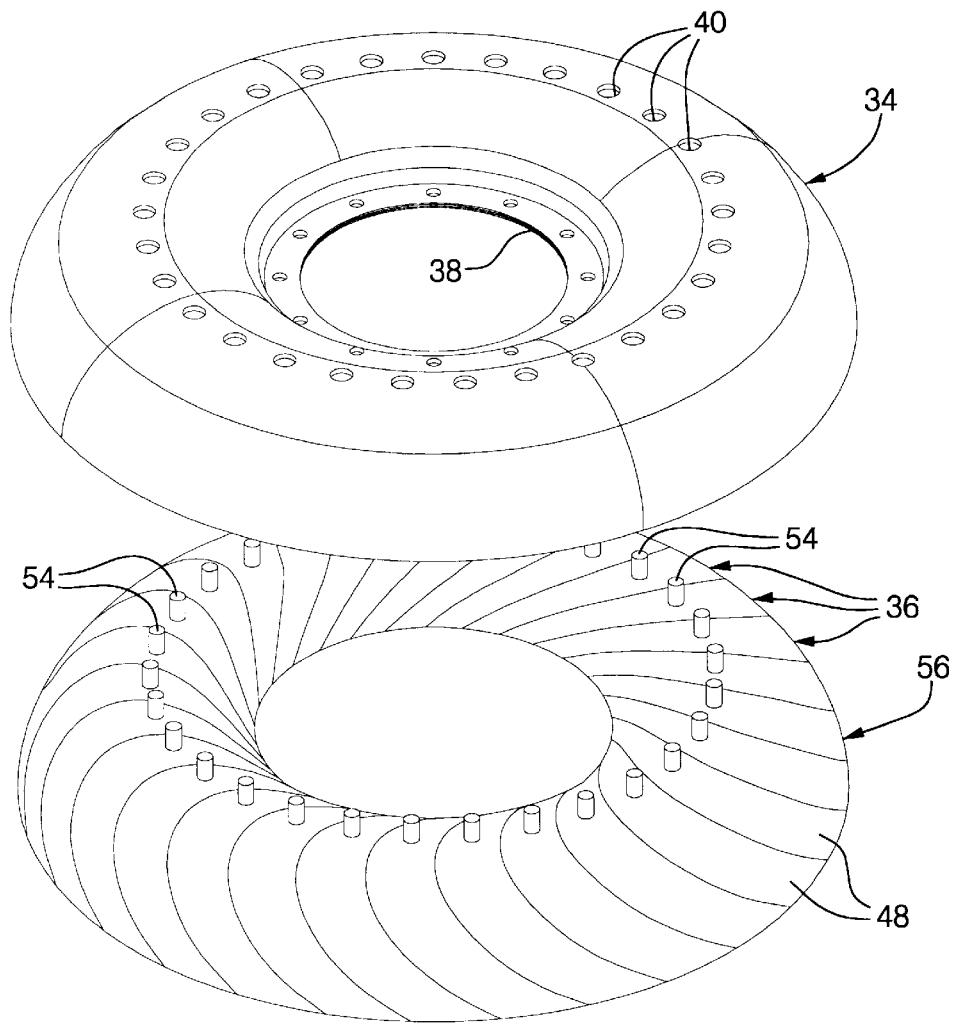
FIG. 6 is an exploded assembly view of the outer shell with the channel inserts in their assembled positions.

FIG. 6 shows the outside of the ring 56 of channel inserts 36 assembled and the outer shell 34 positioned for installation over the pins 54 of the ring.

Figure 7:
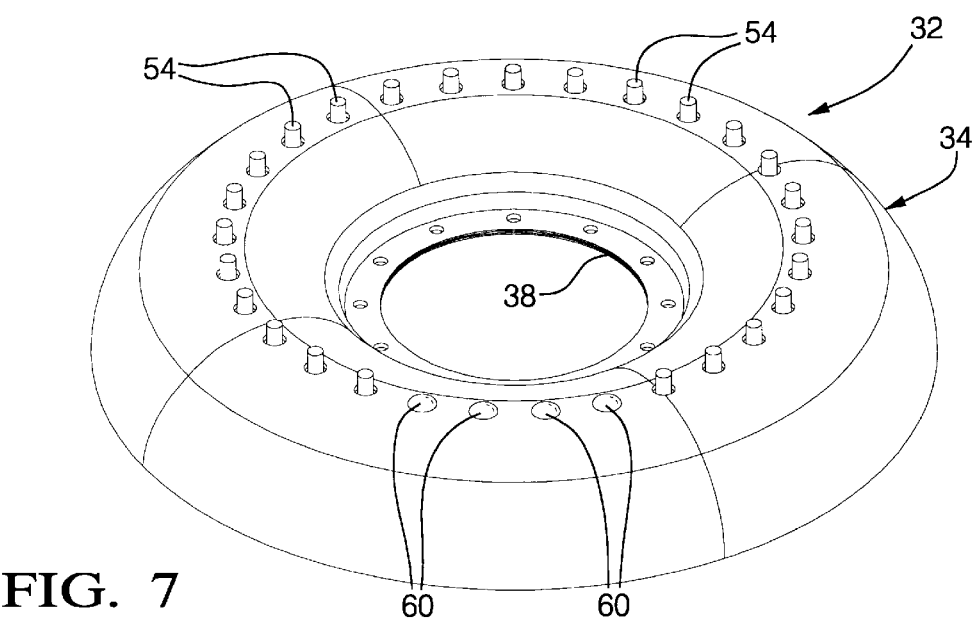
FIG. 7 is a pictorial view of the outer shell and insert assembly prior to and after swaging.

FIG. 7 shows the components of the turbine 32 after assembly with the pins 54 extending through the openings 40 of the shell 34. At this point, the pins are pressed or swaged against the outside of the shell to fix the channel inserts within the shell. A few of the pins, indicated by numerals 60, are shown after swaging to illustrate the final appearance of the assembly.

Figure 8:
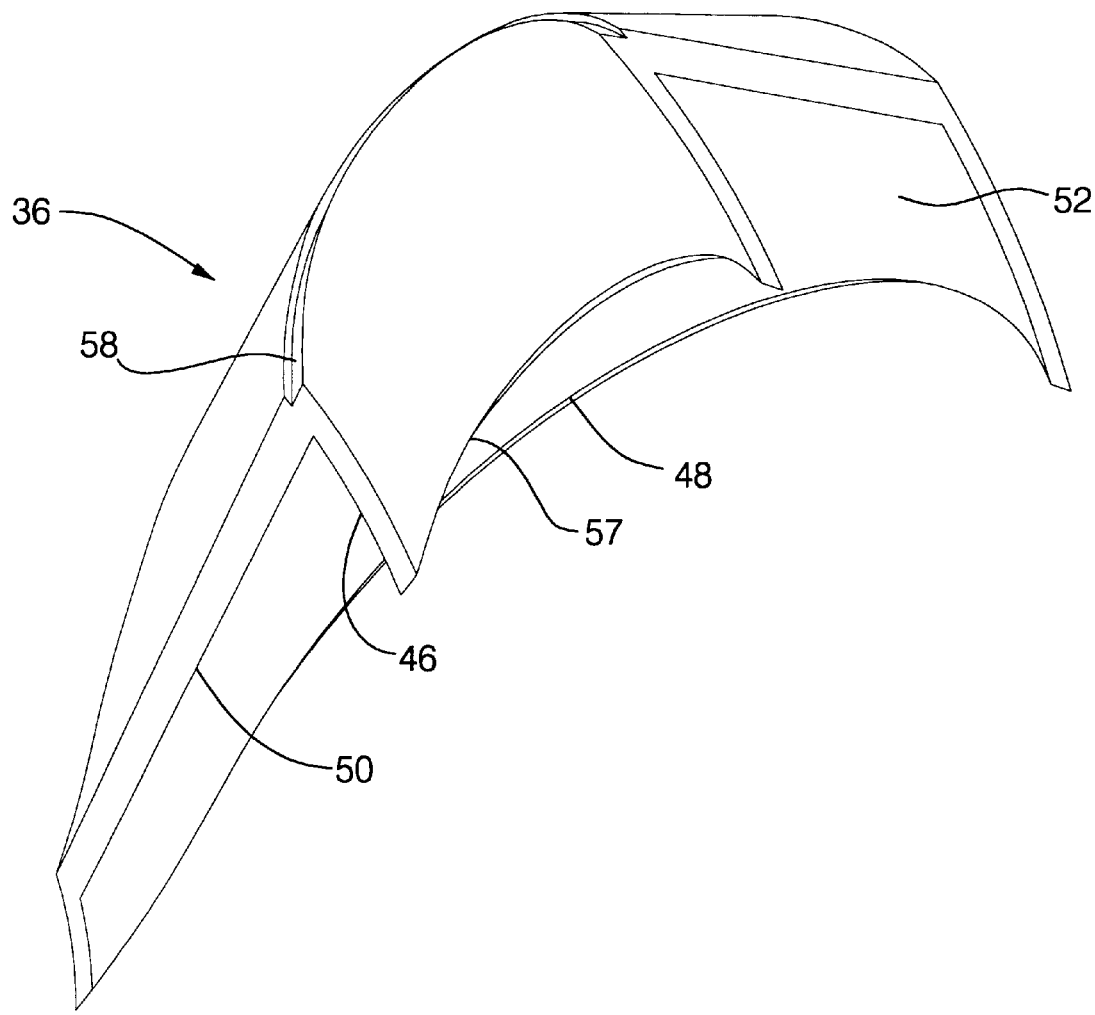
FIG. 8 is a pictorial inside view of one of the channel inserts showing its support groove.

FIG. 8 illustrates one of the channel inserts 36 viewed from an inside angle that shows the groove 58 in which the free edge 57 of the inner side of an adjoining insert is supported. The free edge 57 of the pictured insert 36 is also shown as are the remaining features identified by reference numerals.

While the invention has been described by reference to certain preferred embodiments, it should be understood that numerous changes could be made within the spirit and scope of the inventive concepts described. Accordingly, it is intended that the invention not be limited to the disclosed embodiments, but that it have the fill scope permitted by the language of the following claims.

What is claimed is:

1. A coupling member for a hydrodynamic torque converter, said member comprising:

a shell defining an open sided annular chamber;

a plurality of channel inserts disposed in said chamber, each of said inserts including generally concentric curved inner and outer walls connected to one another along one edge by a curved connecting wall forming a vane, the channel inserts together defining a plurality of annularly spaced closed curved channels for the flow of hydrodynamic fluid.

2. A coupling member as in claim 1 wherein the curved channels are arranged in generally radial orientation.

3. A coupling member as in claim 1 wherein said inserts are arranged in adjoining annular relation in the chamber with unconnected edges of the inner and outer walls engaging the connecting wall of the adjoining insert.

4. A coupling member as in claim 1 wherein said inserts include securing means for fixing the inserts in the chamber defined in the shell.

5. A coupling member as in claim 4 wherein the securing means are deformable pins extending from the outer walls of the inserts through openings in the cover and retained therein.

6. A coupling member as in claim 1 wherein said inserts are molded from plastic material.

7. A coupling member as in claim 6 wherein said plastic material is a polyamid.

8. A coupling member as in claim 6 wherein said plastic material is a polyimid.

9. A molded insert for use in a coupling member of a hydrodynamic coupling, said insert comprising:

a pair of generally concentric curved inner and outer walls connected to one another along one edge by a curved connecting wall forming a vane, the walls together defining a curved channel for the flow of hydrodynamic fluid.

10. A molded insert as in claim 9 wherein the insert includes an integrally molded pin projecting from the outer wall.

* * * * *